US012193492B2

(12) United States Patent
Dayioglu et al.

(10) Patent No.: US 12,193,492 B2
(45) Date of Patent: *Jan. 14, 2025

(54) CARTRIDGE FOR USE WITH AEROSOL GENERATING DEVICE

(71) Applicant: Altria Client Services LLC, Richmond, VA (US)

(72) Inventors: Onur Dayioglu, Neuchatel (CH); Jean-Yves Vollmer, Neuchatel (CH); Gerard Zuber, Neuchatel (CH)

(73) Assignee: Altria Client Services LLC, Richmond, VA (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/885,766

(22) Filed: Aug. 11, 2022

(65) Prior Publication Data

US 2022/0378090 A1 Dec. 1, 2022

Related U.S. Application Data

(63) Continuation of application No. 16/235,052, filed on Dec. 28, 2018, now Pat. No. 11,425,930, which is a (Continued)

(30) Foreign Application Priority Data

Dec. 28, 2017 (EP) .................................. 172108599

(51) Int. Cl.

*A24F 47/00* (2020.01)
*A24B 15/167* (2020.01)
(Continued)

(52) U.S. Cl.

CPC ............ *A24F 40/42* (2020.01); *A24B 15/167* (2016.11); *A24F 7/00* (2013.01); *A24F 40/46* (2020.01);
(Continued)

(58) Field of Classification Search

CPC . A24D 1/20; A24F 40/20; A24F 40/42; A24F 40/485

See application file for complete search history.

(56) References Cited

U.S. PATENT DOCUMENTS

| | | | |
|---|---|---|---|
| 4,284,089 | A | 8/1981 | Ray |
| 2005/0016550 | A1 | 1/2005 | Katase |

(Continued)

FOREIGN PATENT DOCUMENTS

| | | | |
|---|---|---|---|
| CN | 102655773 | A | 9/2012 |
| CN | 106793834 | A | 5/2017 |

(Continued)

OTHER PUBLICATIONS

Chinese Office Action for corresponding Application No. 201880078529.1, dated Mar. 2, 2023, with English Translation.

(Continued)

*Primary Examiner* — Eric Yaary

(74) *Attorney, Agent, or Firm* — Harness, Dickey & Pierce, P.L.C.

(57) ABSTRACT

A cartridge for use with an aerosol generating device includes a housing defining a closed end, an open end, and an aperture between the closed end and the open end. The cartridge further includes a composition including nicotine in the housing in proximity to the closed end. The cartridge also includes a flow control apparatus in the housing. The flow control apparatus includes a proximal end, a distal end, and an internal airflow passageway between the distal end and the proximal end. A seal is formed between an exterior of the flow control apparatus and an interior of the housing. The seal is between the open end of the housing and the aperture of the housing. A channel is at least partially defined by the interior of the housing. The channel is in communi- (Continued)

cation with the aperture and directs air from the aperture towards the composition including nicotine.

17 Claims, 10 Drawing Sheets

Related U.S. Application Data continuation of application No. PCT/EP2018/083779, filed on Dec. 6, 2018.

(51) Int. Cl.

| | |
|---|---|
| ***A24F 7/00*** | (2006.01) |
| ***A24F 40/42*** | (2020.01) |
| ***A24F 40/46*** | (2020.01) |
| ***A24F 40/485*** | (2020.01) |
| ***H05B 3/46*** | (2006.01) |
| *A24F 40/20* | (2020.01) |

(52) U.S. Cl.

CPC ............. *A24F 40/485* (2020.01); *H05B 3/46* (2013.01); *A24F 40/20* (2020.01)

(56) References Cited

U.S. PATENT DOCUMENTS

| | | | |
|---|---|---|---|
| 2011/0094523 | A1 | 4/2011 | Thorens et al. |
| 2013/0192623 | A1 | 8/2013 | Tucker et al. |
| 2013/0220315 | A1 | 8/2013 | Conley et al. |
| 2014/0261492 | A1 | 9/2014 | Kane et al. |
| 2015/0047656 | A1 | 2/2015 | Robinson et al. |
| 2016/0120228 | A1 | 5/2016 | Rostami et al. |
| 2016/0295916 | A1* | 10/2016 | Malgat ..................... A24D 1/20 |
| 2016/0331032 | A1* | 11/2016 | Malgat ................... H05B 6/108 |
| 2017/0064999 | A1 | 3/2017 | Perez et al. |
| 2017/0119055 | A1 | 5/2017 | Liu |
| 2017/0265523 | A1 | 9/2017 | Lipowicz |
| 2017/0295846 | A1 | 10/2017 | Liu |
| 2018/0271152 | A1 | 9/2018 | Silvestrini et al. |
| 2019/0274360 | A1 | 9/2019 | Liu et al. |

FOREIGN PATENT DOCUMENTS

| | | | |
|---|---|---|---|
| CN | 107105791 | A | 8/2017 |
| CN | 107734982 | A | 2/2018 |
| CN | 108697179 | A | 10/2018 |
| JP | 2013-507976 | A | 3/2013 |
| JP | 2017-506890 | A | 3/2017 |
| JP | 2017-532064 | A | 11/2017 |
| JP | 2017-537634 | A | 12/2017 |
| KR | 20140067691 | A | 6/2014 |
| RU | 2616556 | C2 | 4/2017 |
| WO | WO-2012043941 | A1 | 4/2012 |
| WO | WO-2015149311 | A | 10/2015 |
| WO | WO-2017001352 | A2 | 1/2017 |
| WO | WO-2018019543 | A1 | 2/2018 |
| WO | WO-2018019578 | A1 | 2/2018 |

OTHER PUBLICATIONS

Notice of Allowance dated Feb. 15, 2024 issued in related Korean patent application No. 10-2020-7020138.

Japanese Notice of Allowance for Application No. 2020-531712, dated Jun. 29, 2023, with English translation included.

European Search Report for Euorpean Application No. EP17210859 completed Jun. 19, 2018.

PCT/EP2018/065226 (Not Yet Published) last search Dec. 28, 2018, Internet URL: https://patents.google.com/patent/WO2018224677A2/en?oq=PCT%2fEP2018%2f065226.

International Search Report and Written Opinion for corresponding International Application No. PCT/EP2018/083779 dated Mar. 8, 2019.

Written Opinion for corresponding Application No. PCT/EP2018/083779, dated Nov. 13, 2019.

Second Written Opinion of the International Preliminary Examining Authority for Application No. PCT/EP2018/083779, dated Feb. 13, 2020.

International Preliminary Report on Patentability for corresponding Application No. PCT/EP2018/083779, dated Apr. 20, 2020.

Russian Office Action and Search Report for corresponding Application No. 2020124820/03(042951), dated Dec. 13, 2021, and English translation included.

Russian Decision to Grant for corresponding Application No. 2020124820, dated Jun. 7, 2022, with English Translation.

Japanese Office Action for corresponding Application No. 2020-531712, dated Jan. 30, 2023, with English Translation included herewith.

* cited by examiner

CARTRIDGE FOR USE WITH AEROSOL GENERATING DEVICE

CROSS-REFERENCE TO RELATED APPLICATIONS

This application is a continuation of U.S. application Ser. No. 16/235,052, filed Dec. 28, 2018, which is a continuation of, and claims priority to, international application no. PCT/EP2018/083779, filed on Dec. 6, 2018, and further claims priority under 35 U.S.C. § 119 to European Patent Application No. 17210859.9, filed Dec. 28, 2017, the entire contents of each of which are incorporated herein by reference.

BACKGROUND

Field

Example embodiments relate to cartridges for use with an aerosol generating device.

Description of Related Art

Cartridges include a composition, for example a composition containing nicotine, and an airflow path that, when heated by the aerosol generating device, permits aerosol generated from the composition to be efficiently delivered along the airflow path.

The cartridge has a mouth end that the generated aerosol to be drawn towards and a distal end having a heating element configured to heat the distal end of the cartridge. The composition is disposed in the cartridge in proximity to the distal end. When heated by the heating element of the aerosol generating device, aerosol may be produced by the composition, which may be drawn toward the mouth end of the cartridge.

Cartridges comprising nicotine for use with aerosol generating articles may include a liquid composition, such as an e-liquid, that is heated by a coiled electrically resistive filament.

Use of alternative forms of compositions comprising nicotine, such as gels, may reduce potential leakage concerns, but may require different heating schemes and different airflow schemes to allow aerosol generated from the heated composition to be efficiently drawn toward the mouth end.

SUMMARY

At least one example embodiment relates to a cartridge for use with an aerosol generating device.

In at least one example embodiment, the cartridge includes a housing defining a closed end, an open end, and an aperture between the closed end and the open end. The cartridge includes a composition disposed in the housing in proximity to the closed end. The composition is nicotine. The cartridge includes a flow control apparatus disposed in the housing. The flow control apparatus includes a proximal end, a distal end, and an internal airflow passageway between the distal end and the proximal end. The proximal end is closer to the open end of the housing than the distal end. The cartridge includes a seal between an exterior of the flow control apparatus and an interior of the housing. The seal is between the open end of the housing and the aperture of the housing. The cartridge includes a channel between a portion of the exterior of the flow control apparatus and the interior of the housing. The channel is in communication with the aperture and directs air towards the composition including nicotine.

In at least one example embodiment, the channel includes sidewalls extending a length of the channel. In at least one example embodiment, the housing defines a plurality of apertures circumscribing the housing.

In at least one example embodiment, the internal airflow passageway includes a first portion between the proximal end and the distal end. The first portion has a cross-sectional area that decreases from the distal end towards the proximal end.

In at least one example embodiment, the internal airflow passageway further includes a second portion closer to the proximal end than the first portion. The second portion of the internal airflow passageway has a cross-sectional area that increases from the distal end towards the proximal end.

In at least one example embodiment, the flow control apparatus and the housing are separate parts. The flow control apparatus is removably securable to the housing. The seal between the exterior of the flow control apparatus and the interior of the housing includes an interference fit between the flow control apparatus and the housing.

In at least one example embodiment, the housing includes a first part and a second part. The first part includes a mouthpiece configured to retain the second part. The second part includes the composition, which includes nicotine. The first part includes the flow control apparatus. In at least one example embodiment, the composition is a gel.

At least one example embodiment relates to a system comprising a cartridge. The cartridge includes a housing defining a closed end, an open end, and an aperture between the closed end and the open end. The cartridge includes a composition disposed in the housing in proximity to the closed end. The composition is nicotine. The cartridge includes a flow control apparatus disposed in the housing. The flow control apparatus includes a proximal end, a distal end, and an internal airflow passageway between the distal end and the proximal end. The proximal end is closer to the open end of the housing than the distal end. The cartridge includes a seal between an exterior of the flow control apparatus and an interior of the housing. The seal is between the open end of the housing and the aperture of the housing. The cartridge includes a channel between a portion of the exterior of the flow control apparatus and the interior of the housing. The channel is in communication with the aperture and directs air towards the composition including nicotine. The system includes an aerosol generating device including a receptacle configured to receive at least the closed end of the housing and a heater operably coupled to the receptacle and configured to heat the receptacle.

In at least one example embodiment, the system includes a thermally conductive adaptor including the receptacle. The heater includes an elongate heating element, and the thermally conductive adaptor is configured to transfer heat from the elongate heating element to the receptacle.

BRIEF DESCRIPTION OF THE DRAWINGS

Example embodiments will now be described, by way of example only, with reference to the accompanying drawings.

DETAILED DESCRIPTION

Figure 1A:
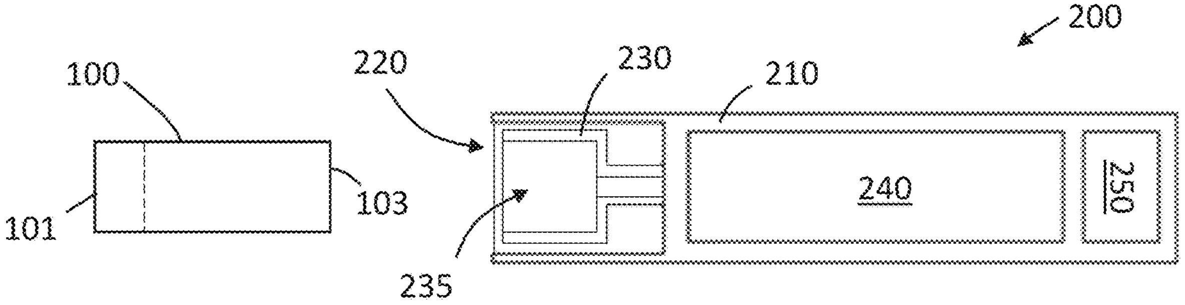
FIG. 1A is a schematic sectional view of an aerosol generating device and a schematic side view of a cartridge that may be inserted into the aerosol generating device in accordance with at least one example embodiment.

Some detailed example embodiments are disclosed herein. However, specific structural and functional details disclosed herein are merely provided for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, etc., but do not preclude the presence or addition of one or more other features, integers, steps, operations, elements, components, etc., and/or groups thereof.

When the words "about" and "substantially" are used in this specification in connection with a numerical value, it is intended that the associated numerical value include a tolerance of ±10% around the stated numerical value, unless otherwise explicitly defined.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations in shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

At least one example embodiment relates to a cartridge for use in an aerosol generating device where the cartridge contains a composition that exhibits little to no leakage of the composition.

In some example embodiments, a cartridge that contains a composition includes a flow control system that efficiently delivers aerosol generated from the composition when the composition is heated by the aerosol generating device.

At least one example embodiment relates to a cartridge for use with an aerosol generating device. The cartridge includes a housing defining a closed end, an open end, and an aperture between the closed end and the open end. The cartridge further comprises a composition disposed in the housing in proximity to the closed end. In at least one example embodiment, the composition comprises nicotine. In at least one example embodiment, the composition is a gel. The cartridge may also include a flow control apparatus disposed in the housing. The flow control apparatus includes a proximal end, a distal end, and an internal airflow passageway between the distal end and the proximal end. A seal is formed between an exterior of the flow control apparatus and an interior of the housing. The seal is between the open end of the housing and the aperture of the housing. A channel is defined between a portion of the exterior of the flow control apparatus and the interior of the housing. The channel is in communication with the aperture and directs air from the aperture towards the composition.

In some example embodiments, the channel may extend substantially around the interior of the housing. In some example embodiments, the channel may extend less than fully around the interior of the housing. The channel is defined between the flow control apparatus and the housing. In some example embodiments, the channel may be formed, at least in part, by the interior of the housing. In some example embodiments, the channel may be formed, at least in part, by the exterior of the flow control apparatus. In some example embodiments, the channel may be formed, at least in part, by the interior of the housing and the exterior of the flow control apparatus.

Airflow management, including the flow control apparatus and channel of the cartridge may provide for efficient transfer of aerosol generated from the composition to a mouth end. Furthermore, if the composition comprises a gel, the composition is less likely to leak from the cartridge than a liquid composition.

The cartridge includes the mouth end that the generated aerosol is drawn toward and a distal end that may be received by an aerosol generating device having a heating element configured to heat the distal end of the cartridge. The composition is disposed in proximity to the distal end of the cartridge. The aerosol generating device may heat the composition in the cartridge to generate an aerosol, which may be drawn toward the mouth end of the cartridge. For example, where the composition comprises nicotine, the aerosol generating device may heat the composition in the cartridge to generate an aerosol comprising nicotine, which may be drawn toward the mouth end of the cartridge.

The cartridge, or portions of the cartridge, containing the composition may be single-use cartridges or multi-use cartridges. In some example embodiments, portions of the cartridges are re-usable, and portions are disposable after a single use. For example, the cartridges may include a mouthpiece that may be re-usable and a single use portion that contains the composition. In some example embodiments comprising both reusable portions and single use portions, the reusable portions may be removable from the single use portions.

The cartridge includes a housing. The housing may comprise a single part or multiple parts. The housing defines an open end and a closed end. The composition is disposed in proximity to the closed end. The aerosol generated from the composition may be drawn toward the open end. The housing defines at least one aperture between the open end and the closed end. The at least one aperture defines at least one air inlet, such that when air is drawn through the open end of the housing, air enters the cartridge through the aperture. The air may be drawn through the open end of the cartridge to draw air into the cartridge through the aperture. The channel directs air from the aperture towards the closed end of the cartridge. Air drawn into the cartridge through the aperture may flow along the channel of the cartridge towards the composition at the closed end, then through the internal airflow passageway of the flow control apparatus from the distal end to the proximal end and out of the cartridge at the open end.

By spacing the aperture from the closed end of the housing, the aperture is separated from the composition, reducing the likelihood of leakage of the composition through the aperture. Furthermore, by providing a channel for airflow from the aperture to the composition, formed between the interior of the housing and an exterior portion of the flow control apparatus, airflow from the aperture may be directed towards the composition and the flow control apparatus may act as a further obstacle between the composition and the aperture to further reduce the likelihood of leakage of the composition through the aperture. In addition, the internal airflow passageway of the flow control apparatus provides air and vapor generated from the composition with a pathway to be drawn out of the housing through the open end. The pathway provided by the airflow passageway of the flow control apparatus may have an airflow cross-section that is defined or varied along the length of the passageway to improve the flow of aerosol generated from the composition from the closed end of the housing to the open end of the housing.

The cartridge includes a flow control apparatus. The housing and the flow control apparatus, or portions thereof, may be formed as a single part or separate parts. The flow control apparatus may be formed as a single part or separate parts. The flow control apparatus is disposed in the housing and has a proximal end, a distal end, and an internal airflow passageway between the distal end and the proximal end. The proximal end is closer to the open end of the housing than the distal end.

The internal airflow passageway of the flow control apparatus has an airflow cross-section between the proximal end and the distal end.

As used herein, "airflow cross-section" is a cross-sectional area of a passageway through which air is able to flow.

As used herein, "cross-sectional area" is a maximum transverse cross-sectional area of the cartridge or a portion or a part of the cartridge.

In some example embodiments, the airflow cross-section of the airflow passageway may be substantially constant from the distal end to the proximal end. The airflow passageway may have any suitable inner diameter. For example, the inner diameter of the airflow passageway may be between about 1 mm to about 5 mm, such as about 2 mm. The airflow passageway may have an airflow cross-section that is smaller than the airflow cross-section within the housing around the distal end of the flow control apparatus.

As such, the flow control apparatus presents a constricted airflow cross-section for accelerating air entering the airflow passageway at the distal end.

In some example embodiments, the airflow cross-section of the airflow passageway may vary from the distal end to the proximal end. For example, the airflow cross-section at the distal end of the airflow passageway may be greater than the airflow cross-section at the proximal end of the airflow passageway. Where the airflow cross-section of the airflow passageway is greater at the distal end than at the proximal end, the diameter of the airflow passageway at the proximal end may be between about 0.5 mm to about 3 mm, such as about 1 mm, and the diameter of the airflow passageway at the distal end may be between about 1 mm to about 5 mm, such as about 2 mm.

The flow control apparatus may have any suitable length. For example, the flow control apparatus may have a length from about 3 mm to about 50 mm, such as from about 4 mm to about 30 mm, such as about 25 mm.

The internal airflow passageway of the flow control apparatus may be configured to accelerate air as air flows from the distal end towards the proximal end. The internal airflow passageway of the flow control apparatus may have one or more portions arranged between the distal end and the proximal end that are adapted to control the flow of air through the airflow passageway from the distal end to the proximal end.

The airflow passageway of the flow control apparatus may comprise a first portion between the proximal end and the distal end that is configured to accelerate air as air flows from the distal end towards the proximal end of the flow control apparatus. The first portion of the airflow passageway may be configured in any suitable manner to accelerate air as air flows through the airflow passageway from the distal end towards the proximal end of the airflow passageway. For example, the first portion of the airflow passageway may include guides defining a constricted airflow cross-section, which force air to accelerate substantially in the axial direction from the distal end towards the proximal end.

The airflow passageway may comprise a first portion between the proximal end and the distal end. The airflow passageway has an airflow cross-section at the distal end of the airflow passageway greater than an airflow cross-section at the first portion of the airflow passageway.

In some example embodiments, the airflow cross-section of the first portion of the airflow passageway may constrict from a location closer to the distal end of the flow control apparatus to a location closer to the proximal end of the flow control apparatus to cause the air to accelerate as air flows from the distal end towards the proximal end. In other words, the airflow cross-section of the first portion may constrict from the distal end of the first portion to the proximal end of the first portion. The airflow passageway may comprise a first portion between the proximal end and the distal end. The first portion has a cross-sectional area that decreases from the distal end towards the proximal end. Thus, the distal end of the first portion of the airflow passageway (the location closer to the distal end of the flow control apparatus) may have an inner diameter greater than the proximal end of the first portion (the location closer to the proximal end of the flow control apparatus).

In some example embodiments, the airflow cross-section of the first portion of the airflow passageway may be substantially constant from the distal end of the first portion to the proximal end of the first portion. In some example embodiments, the substantially constant airflow cross-section of the first portion of the airflow passageway may be smaller than the airflow cross-section at the distal end of the airflow passageway.

As used herein, "diameter" or "width" is a maximum transverse dimension of the cartridge or a portion or a part of the cartridge. By way of example, the "diameter" may be a diameter of an object having a circular transverse cross-section or may be a width of an objection having rectangular transverse cross-section.

As used herein, an airflow cross-section that is "constricted" from a first location to a second location means that the airflow cross-section reduces in diameter from the first location to the second location.

Where the airflow cross-section of the first portion of the airflow passageway is constricted from the distal end to the proximal end, the constriction of the airflow cross-section may comprise a reduction in the diameter of the airflow passageway from the distal end of the first portion to the proximal end of the first portion. The constriction of the airflow cross-section from the distal end to the proximal end may be continuous. For example, the reduction in the diameter of the airflow passageway may be linear from the distal end to the proximal end of the first portion. The constriction may be uniform or non-uniform. For example, the rate of constriction of the airflow cross-section may increase from the distal end to the proximal end of the first portion. The constriction of the airflow cross-section may be stepped. In other words, the airflow cross-section may constrict in discrete increments or steps from the distal end to the proximal end. In some embodiments, the constriction is linear and uniform around the circumference of the airflow passageway from the distal end to the proximal end of the first portion.

The first portion (the air accelerating portion) of the airflow passageway may have any suitable shape. An inner surface of the flow control apparatus defining the first portion of the airflow passageway may have a frustoconical shape.

The proximal end of the first portion of the airflow passageway may have any suitable inner diameter. For example, the inner diameter of the proximal end of the first portion of the airflow passageway may be between about 0.5 mm to about 3 mm, such as about 1 mm.

The distal end of the first portion of the airflow passageway may have any suitable inner diameter. For example, the inner diameter of the distal end of the first portion of the airflow passageway may be between about 1 mm to about 5 mm, such as about 2 mm.

The ratio of the diameter of the proximal end of the first portion of the airflow passageway to the diameter of the distal end of the first portion of the airflow passageway may be any suitable ratio. For example, the ratio may be between about 1:4 and about 3:4, or between about 2:5 and about 3:5, or may be about 1:2.

The first portion of the airflow passageway may have any suitable length. In other words, the distance between the proximal end and the distal end of the first portion of the airflow passageway may be any suitable distance. For example, the length of the first portion of the airflow passageway may be from about 3 mm to about 15 mm, such as from about 4 mm to about 7 mm, or about 5.5 mm.

The internal airflow passageway of the flow control apparatus may comprise a second portion closer to the proximal end of the flow control apparatus than the first portion. In other words, the second portion may be arranged downstream of the first portion. The second portion of the airflow passageway may be configured to decelerate air flowing from the distal end towards the proximal end of the flow control apparatus. The airflow cross-section of the second portion of the airflow passageway may expand from a location closer to the distal end of the flow control apparatus to a location closer to the proximal end of the flow control apparatus to cause the air to decelerate as air flows from the distal end towards the proximal end. In other words, the second portion of the airflow passageway may comprise a distal end and a proximal end and the airflow cross-section of the second portion may expand from the distal end to the proximal end. The airflow passageway may comprise a second portion closer to the proximal end than the first portion so that the cross-sectional area of the second portion of the airflow passageway increases from the distal end towards the proximal end. Thus, the location closer to the proximal end may have an inner diameter greater than the location closer to the distal end.

As used herein, an airflow cross-section that is "expanded" from a first location to a second location means that the airflow cross-section increases in diameter from the first location to the second location.

The expansion of the airflow cross-section from the distal end of the second portion of the airflow passageway to the proximal end of the airflow passageway may be continuous. The expansion may be uniform or non-uniform. For example, the expansion may be stepped. For example, the expansion may be linear. For example, the rate of expansion of the airflow cross-section may increase from the distal end to the proximal end of the first portion. In some embodiments, the expansion is continuous and uniform from the location closer to the distal end to the location closer to the proximal end.

The second portion (the air decelerating portion) of the airflow passageway may have any suitable shape. An inner surface of the flow control apparatus defining the second portion of the airflow passageway may have a frustoconical shape.

The proximal end of the second portion of the airflow passageway may have any suitable inner diameter. For example, the inner diameter of the proximal end may be between about 2 mm to about 6 mm, such as between about 3 mm to about 5.5 mm, such as about 5 mm.

The distal end of the second portion of the airflow passageway may have any suitable inner diameter. In some example embodiments, the distal end of the second portion may have the same diameter as the distal end of the first portion. For example, the inner diameter of the distal end of the second portion may be between about 0.5 mm to about 3 mm, such as about 1 mm. In some embodiments, the distal end of the second portion may have a different diameter to the proximal end of the first portion. For example, the inner diameter of the distal end may be between about 1 mm to about 6 mm, such as between about 2 mm to about 5 mm, such as about 4.2 mm.

The second portion of the airflow passageway, if present, may have any suitable length. For example, the second portion of the airflow passageway may have a length from about 0.2 mm to about 20 mm, such as from about 1 mm to about 10 mm, such as between about 3 mm and about 7 mm, such as about 4.5 mm.

In some example embodiments, the internal airflow passageway of the flow control apparatus may comprise a third portion closer to the distal end of the flow control apparatus than the first portion. In other words, the third portion may be arranged upstream of the first portion.

The third portion may comprise a chamber having a substantially constant inner diameter along its length, relative to the first and second portions. The third portion may provide a chamber to enable cooling of the air, vapor, and aerosol before reaching the air accelerating portion. The third portion may also provide additional control of the resistance to draw (RTD) of the flow control apparatus.

The third portion may have a substantially constant inner diameter of between about 2 mm and about 6 mm, such as about 5 mm or in particular about 4.8 mm or about 5.09 mm. The third portion may have a distal end closer to the distal end of the flow control apparatus and a proximal end closer to the proximal end of the flow control apparatus. In some example embodiments, the third portion may be slightly tapered from the distal end to the proximal end. For example, the inner diameter at the distal end of the third portion may be about 5.1 mm and the distal portion at the proximal end of the third portion may be about 4.8 mm. A slight taper of the inner diameter from the distal end to the proximal end may facilitate manufacture of the flow control apparatus.

The third portion of the airflow passageway may have any suitable length. For example, the third portion of the airflow passageway may have a length of between about 1 mm and about 50 mm, such as between about 5 mm and about 30 mm or about 15 mm.

In some example embodiments, the airflow passageway of the flow control apparatus is defined by a first portion only. In some example embodiments, the airflow passageway of the flow control apparatus comprises a first portion and a second portion closer to the proximal end of the flow control apparatus than the first portion (i.e. downstream of the first portion). In some example embodiments, the airflow passageway of the flow control apparatus comprises a first portion, a second portion closer to the proximal end of the flow control apparatus than the first portion (i.e. downstream of the first portion), and a third portion closer to the distal end of the flow control apparatus than the first portion (i.e. upstream of the first portion).

The cartridge comprises a seal between an exterior of the flow control apparatus and an interior of the housing. If the housing and the flow control apparatus, or portions thereof, are formed from the same part, the seal may be formed by the integration of the components into the single part. If the housing and the flow control apparatus are formed from separate parts, the seal may be formed by, for example, an interference fit of the flow control apparatus in the housing. In particular, the seal may be formed by an interference fit between a proximal portion of the exterior of the flow control apparatus and an interior of the housing. A gasket, such as an o-ring, between the housing and the flow control apparatus may be employed to form the seal or assist in forming the seal. The seal is located between the open end of the housing and the at least one aperture.

In some example embodiments, the flow control apparatus is removably secured to the housing. For example, the flow control apparatus may be received in the housing by the interference fit, threaded engagement, or the like, such that the flow control apparatus may be securely inserted and removed from the housing without damaging the housing or the flow control apparatus. Secure insertion of the flow control apparatus in the housing may produce a seal between the flow control apparatus and the housing.

The cartridge comprises at least one channel in communication with an aperture of the housing. The channel is formed, at least in part, by the housing. The channel directs air from the aperture towards the closed end of the cartridge. The channel directs air from the aperture towards the composition. In some embodiments, the channel is formed between an exterior surface of the flow control apparatus and an interior surface of the housing.

The cartridge may comprise more than one channel. In some embodiments, the cartridge comprises from about 2 to about 20 channels between the outer surface of the flow control apparatus and the inner surface of the housing. For example, the cartridge may comprise from about 5 to about 15 channels, such as from about 10 to 12 channels.

In at least one example embodiment, each channel is in communication with at least one aperture through the housing. However, the cartridge may comprise one or more channels that are not in direct communication with an aperture.

The aperture may be positioned at any suitable location of the housing. In some example embodiments, the housing may comprise more than one aperture. For example, the housing may comprise from about 2 to about 20 apertures. The number of apertures may be equal to the number of channels. If the number of apertures is equal to the number of channels, each aperture may correspond to a separate channel. If the housing comprises more than one aperture, the apertures may be arranged in any suitable manner. In at least one example embodiment, the apertures are circumferentially disposed around the housing. The apertures may be disposed circumferentially around the housing, and the apertures may be spaced from the closed end of the housing by the same distance.

The channels may comprise sidewalls. In at least one example embodiment, the sidewalls extend the length of the channel. In some embodiments, the sidewalls extend between an exterior of the flow control apparatus and the interior of the housing. The sidewalls may extend from the exterior of the flow control apparatus, the interior of the housing, or the exterior of the flow control apparatus and the interior of the housing. The sidewalls may be formed from the same part as the exterior of the flow control apparatus or the interior of the housing.

The channels may have any suitable width. For example, a channel may extend fully around the interior of the housing. The channel extends less than fully around the housing, such as less than about 90% around the housing, less than about 70% around the housing, or less than about 50% around the housing. In some embodiments, the channel extends at least about 2% around the housing, such as at least about 5% around the housing.

The channels may have a distal end spaced from the closed end of the housing. The distal end of the channels may be at the distal end of the flow control apparatus. The distal end of a channel may be any suitable distance from the closed end of the housing. For example, the distal end of the channel may be from about 2 mm to about 20 mm from the closed end of the housing, such as from about 7 mm to about 17 mm from the closed end of the housing, or about 15 mm from the closed end of the housing.

Where a channel has sidewalls, the channel may have a width defined by the distance between the side walls. The channels may have any suitable width. For example, the width of the channels may vary from about 0.5 to about 2 mm, such as from about 0.75 mm to about 1.5 mm, such as about 1.5 mm.

A channel may have a depth defined from the inner surface of the housing to the outer surface of the flow control apparatus. The channels may have any suitable depth. The depth of the channel may be constant along the length of the channel. The depth of the channel may vary along the length of the channel. In some example embodiments, the depth of the channel increases from a location in proximity to the aperture to a distal end of the channel, which is the end of the channel closest to the closed end of the housing. For example, the outer surface of the flow control apparatus defining the channel may be inwardly tapered from the location in proximity to the aperture to the distal end of the channel. This may facilitate manufacture of at least one of the flow control apparatus and the housing.

Regardless of whether the depth of the channel is constant or varies along the length of the channel, the channel may have a depth from about 0.3 mm to about 1.5 mm, such as from about 0.5 mm to about 1 mm, or about 0.75 mm.

The distal end of the flow control apparatus may be positioned a suitable distance from the closed end of the housing such that aerosol generated from the composition may be entrained in air then enters the aperture, flows through the channel and through the internal passageway of the flow control apparatus to the open end. In at least one example embodiment, at least about 5% of the air that flows through the cartridge contacts the composition. In at least one example embodiment, at least about 25% of the air that flows through the cartridge contacts the composition.

In some example embodiments, the distal end of the flow control apparatus is positioned from the closed end of the housing a distance from about 2 mm to about 20 mm, such as from about 7 mm to about 17 mm, or about 15 mm.

The cartridge may have any suitable overall dimensions and shape. The cartridge may have a size and shape similar to Philip Morris International's HEETS® or Heatstick® articles, for use in Philip Morris International's iQOS™ aerosol generating device system. In at least one example embodiment, the cartridge is generally cylindrical. The cartridge may have an outer diameter, for example, from about 5 mm to about 15 mm, such as from about 5 mm to about 10 mm, or from about 7 mm to about 8 mm. The cartridge may have a length, for example, from about 10 mm to about 60 mm, such as from about 50 mm to about 15 mm, such as about 20 mm or about 45 mm.

The cartridges may have any suitable resistance-to-draw (RTD) and may vary depending on the length and dimensions of the channels, the size of the apertures, the dimensions of the most constricted cross-section of the internal passageway, and the like. In many embodiments the RTD of the cartridges is between about 50 and about 140 mm H2O, between about 60 and about 120 mm H2O, or about 90 mm H2O. The RTD of the cartridge refers to the static pressure difference between the one or more apertures and the mouth end of the cartridge when traversed by an airflow under steady conditions in which the volumetric flow is about 17.5 milliliters per second at the mouth end. The RTD of a specimen can be measured using an appropriately modified method from the method set out in ISO Standard 6565:2002.

The cartridges may be formed from any suitable one or more materials. For example, the flow control apparatus may be formed of any suitable one or more materials. For example, the flow control apparatus may be formed from a plastic material, a metal material, a cellulosic material, such as cellulose acetate, paper, cardboard or combinations thereof. The housing may be formed from any suitable one or more materials. For example, the housing, or a portion thereof, may be formed from a metal material, a plastic material, cardboard, or combinations thereof. When the housing is formed by cardboard, the apertures may be formed in the cardboard by laser cuts. When the closed end of the housing is formed by cardboard, the end may be closed by folding the cardboard, placing an end cap on a cardboard tube, pinching and folding the cardboard, or the like.

In some example embodiments, the cartridge comprises a mouthpiece. The mouthpiece may comprise the flow control apparatus, or a portion thereof, and may form at least a proximal portion of the housing of the cartridge. The mouthpiece may connect with the housing, or a distal portion of the housing, in any suitable manner, such as through interference fit, threaded engagement, or the like.

The composition may be placed in the housing in proximity to the closed end prior to final assembly of the cartridge. The flow control apparatus, or a part comprising the proximal portion of the housing, which may contain the flow control apparatus, may be connected to the housing or the portion of the housing comprising the closed end.

Once fully assembled, the cartridge defines an airflow path through which air flows when the generate aerosol is drawn toward the mouth end of the cartridge. When air is drawn through the mouth end of the cartridge, air enters the cartridge through an aperture in the housing, which then flows through the channel towards the closed end of the housing where the air may entrain aerosol generated by heating of the composition. The air with entrained aerosol may then flow through the internal passageway of the flow control apparatus and through the open mouth end of the housing.

The cartridge may comprise any suitable composition. The composition may comprise any suitable components in any suitable concentrations. The cartridge may comprise a composition that does not comprise nicotine (i.e. a nicotine-free composition). The cartridge may comprise any suitable nicotine-free composition. The cartridge may comprise a composition comprising nicotine (i.e. a nicotine-containing composition). The cartridge may comprise any suitable nicotine-containing composition. The nicotine-containing composition may comprise any suitable concentration of nicotine. For example, the composition may comprise about 0.2% by weight to about 5% by weight nicotine, such as from about 1% by weight to about 2% by weight nicotine.

The composition may comprise an aerosol former, such as glycerol. The composition may comprise any suitable concentration of the aerosol former. For example, the composition may comprise about 60% by weight to about 95% by weight of glycerol, such as from about 80% to about 90% by weight glycerol.

The composition may comprise a gelling agent, such as alginate, gellan, guar, or combinations thereof. The composition may comprise any suitable concentration of a gelling agent. For example, the composition may comprise about 0.5% by weight to about 10% by weight gelling agent, such as from about 1% by weight to about 3% by weight gelling agent.

The composition may comprise water. The composition may comprise any suitable concentration of water. For example, the composition may comprise about 5% by weight to about 25% by weight water, such as about 10% by weight water.

The composition may comprise an inorganic cation, such as calcium ions. The composition may comprise any suitable concentration of an inorganic cation. For example, the composition may comprise about 0.2% by weight to about 5% by weight calcium ions, such as about 0.5% by weight calcium ions.

The composition may comprise a flavorant. For example, the composition may comprise menthol. The composition may comprise any other suitable components in any suitable concentrations. In some examples, the composition is a gel.

For purposes of the present disclosure, a "gel" is a substantially dilute cross-linked system, which exhibits no flow when in the steady-state.

The cartridge is configured to be received by an aerosol generating device such that a heating element of the device may heat the closed end of the housing of the cartridge, and thus may heat the composition that is disposed in the housing in proximity to the closed end.

The cartridge may be shaped and sized for use with any suitable aerosol generating device comprising a receptacle for receiving the cartridge and a heating element configured and positioned to heat the distal end of the cartridge when the cartridge is received by the aerosol generating device.

In at least one example embodiment, the aerosol generating device comprises control electronics operably coupled to the heating element. The control electronics may be configured to control heating of the heating element. The control electronics may be internal to a housing of the device.

The control electronics may be provided in any suitable form and may, for example, include a controller or a memory and a controller. The controller may include one or more of an Application Specific Integrated Circuit (ASIC) state machine, a digital signal processor, a gate array, a microprocessor, or equivalent discrete or integrated logic circuitry. Control electronics may include memory that contains instructions that cause one or more components of the circuitry to carry out a function or aspect of the control electronics. Functions attributable to control electronics in this disclosure may be embodied as one or more of software, firmware, and hardware.

The electronic circuitry may comprise a microprocessor, which may be a programmable microprocessor. The electronic circuitry may be configured to regulate a supply of power to the heating element. The power may be supplied to the heating element in the form of pulses of electrical current. The control electronics may be configured to monitor the electrical resistance of the heating element and to control the supply of power to the heating element depending on the electrical resistance of the heating element. In this manner, the control electronics may regulate the temperature of the resistive element.

The aerosol generating device may comprise a temperature sensor, such as a thermocouple, operably coupled to the control electronics to control the temperature of the heating elements. The temperature sensor may be positioned in any suitable location. For example, the temperature sensor may be in contact or in proximity to the heating element. The sensor may transmit signals regarding the sensed temperature to the control electronics, which may adjust heating of the heating element to achieve a suitable temperature at the sensor.

Regardless of whether the aerosol generating device includes a temperature sensor, the device may be configured to heat the composition, which is disposed in the cartridge, to an extent sufficient to generate an aerosol.

The control electronics may be operably coupled to a power supply, which may be internal to the housing. The aerosol generating device may comprise any suitable power supply. For example, a power supply of an aerosol generating device may be a battery, or set of batteries. The batteries or power supply unit can be rechargeable, as well as being removable and replaceable. Any suitable battery may be used.

The aerosol generating device may include any suitable heating element. In at least one example embodiment, the heating element comprises a resistive heating component, such as one or more resistive wires or other resistive elements. The resistive wires may be in contact with a thermally conductive material to distribute heat produced over a broader area. Examples of suitable conductive materials include aluminum, copper, zinc, nickel, silver, and combinations thereof. For purposes of this disclosure, if resistive wires are in contact with a thermally conductive material, both the resistive wires and the thermally conductive material are part of the heating element.

The heating element may be formed in any suitable manner. The heating element may comprise a cavity configured to receive and surround the closed end of the cartridge. The heating element may comprise an elongate element configured to extend along a side of the housing of the cartridge when the closed end of the cartridge is received by the device. In some example embodiments, the heating element of the device is an elongate heating element, and an adaptor may be used to transfer heat from the heating element to the cartridge. For example, the adaptor may comprise a cavity configured to receive and surround the cartridge. The adaptor may be formed from thermally conductive material. For example, adaptor may be formed from aluminum, sheet metal, or the like.

In some example embodiments, the cartridge may comprise more than one internal sub-cartridges, with each sub-cartridge comprising a flow control apparatus and housing generally as described above. The sub-cartridges may be retained in an external housing. The cartridge may comprise a manifold to connect the flow control devices of multiple sub cartridges to a single open end of the external housing.

In some example embodiments, all of the sub-cartridges may comprise the same composition. In some example embodiments, the sub-cartridges may comprise different compositions. In some example embodiments, one sub-cartridge comprises a composition comprising nicotine and another sub-cartridge comprises a nicotine-free composition, for example a composition comprising a flavorant.

In some example embodiments, the aerosol generating device may be configured to receive more than one cartridge described herein. For example, the aerosol generating device may comprise a receptacle into which an elongate heating element extends. One cartridge may be received in the receptacle on one side of the heating element, and another cartridge may be received in the receptacle on the other side of the heating element.

At least some example embodiments are directed to a mouthpiece unit for use with an aerosol generating device, the mouthpiece unit comprising a housing having a first open end and a second open end and an aperture between the first open end and the second open end. The first open end may comprise or form a mouthpiece. A flow control apparatus is disposed in the mouthpiece unit housing. The flow control apparatus comprises a proximal end, a distal end, and an internal airflow passageway between the distal end and the proximal end. The proximal end is closer to the first open end of the housing than the distal end. The internal airflow passageway of the flow control apparatus comprises a first portion between the proximal and the distal end.

The airflow passageway has an airflow cross-section between the proximal end and the distal end and the airflow cross-section at the distal end is greater than the airflow cross-section at the first portion. The first portion of the airflow passageway may comprise an airflow cross-section that is substantially constant from the proximal end to the distal end. The first portion of the airflow passageway may comprise a constricted airflow cross-section from the distal end towards the proximal end. The first portion of the airflow passageway may be configured to accelerate air as the air flows from the distal end towards the proximal end. A seal is provided between an exterior portion of the flow control apparatus and an interior of the housing. The seal is between the first open end of the housing and the aperture of the housing. A channel is provided between the exterior of the flow control apparatus and the interior of the housing. The channel is in communication with the aperture and the second open end of the housing.

The second open end of the mouthpiece unit may be configured to receive a container or a capsule comprising a composition, for example, comprising nicotine. The second open end of the mouthpiece unit may be configured to fluidly communicate with the container or capsule when the container or capsule is received by the mouthpiece unit. The second open end of the mouthpiece unit may be adapted such that the channel and the distal end of the internal airflow passageway are in fluid communication with the composition in the container or capsule when the container or capsule is received by the mouthpiece unit.

The container or capsule comprising the composition may comprise a housing. The second open end of the mouthpiece unit may be configured to removably couple to the housing of the container or capsule. In some embodiments, the mouthpiece unit may comprise a piercing element or a plurality of piercing elements to pierce or puncture the housing of the container or capsule to provide fluid communication between the mouthpiece unit and the composition within the container or capsule. In some embodiments, the container or capsule may comprise a deformable portion or a removable portion that may be deformed or removed to open the container or capsule before the container or capsule is received by the mouthpiece unit.

In some example embodiments, the mouthpiece unit may form part of an aerosol-generating device. The mouthpiece unit may be movably connected to a housing of the aerosol-generating device. For example, the mouthpiece unit may be pivotally or hinged connected to a housing of device or slidably connected to the housing of the device. Movement of the mouthpiece unit relative to the housing of the device may enable a container or capsule comprising a composition to be received by the device and operably connected to the device. The mouthpiece unit may be removably securable to the housing of the aerosol-generating device.

Any of the features described above in relation to the cartridge aspect described above may be equally applicable to the mouthpiece unit aspect and vice versa.

Figure 1B:
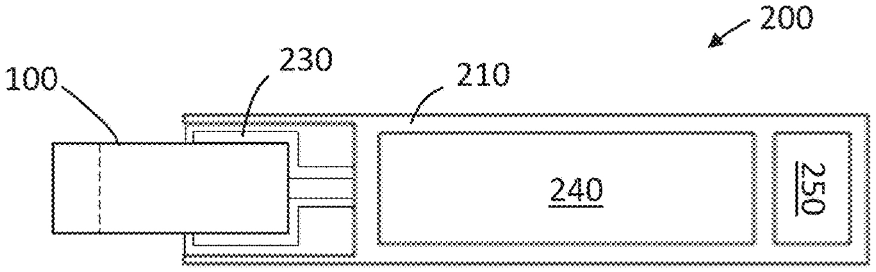
FIG. 1B is a schematic sectional view of the aerosol generating device depicted in FIG. 1A and a schematic side view of the cartridge depicted in FIG. 1A inserted into the aerosol generating device in accordance with at least one example embodiment.

FIGS. 1A and 1B illustrate at least one example embodiment of a cartridge 100 and aerosol generating device 200. The cartridge 100 has a mouth end 101 and a closed distal end 103. In FIG. 1B, the distal end 103 of the cartridge 100 is received in a receptacle 220 of the device 200. The device 200 includes a housing 210 defining the receptacle 220, which is configured to receive the cartridge 100. The device 200 also includes a heating element 230 that forms a cavity 235 configured to receive the cartridge 100, for example, by an interference fit. The heating element 230 may comprise an electrically resistive heating component. In addition, the device 200 includes a power supply 240 and control electronics 250 that cooperate to control heating of heating element 230.

The heating element 230 may heat the distal end 103 of the cartridge 100, which contains a composition comprising nicotine. Heating of the cartridge 100 causes the composition to form an aerosol containing nicotine, which may be drawn through the mouth end 101 of the cartridge 100.

Figure 2A:
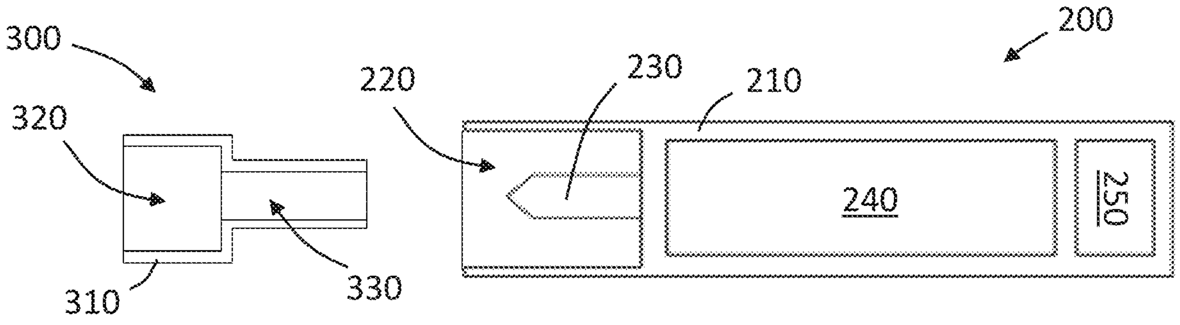
FIG. 2A is a schematic sectional view of an adaptor and an aerosol generating device into which the adaptor may be inserted in accordance with at least one example embodiment.
Figure 2B:
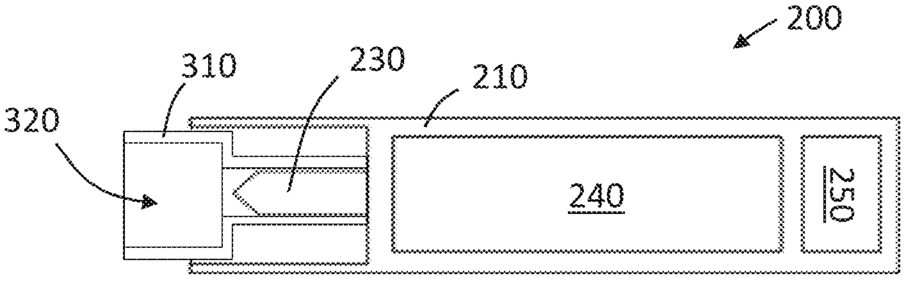
FIG. 2B is a schematic sectional view of the adaptor depicted in FIG. 2A inserted into the aerosol generating device depicted in FIG. 2B in accordance with at least one example embodiment.
Figure 2C:
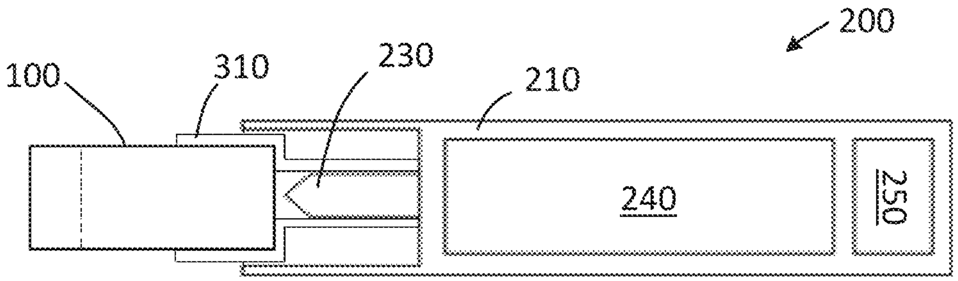
FIG. 2C is a schematic sectional view of the adaptor and aerosol generating device depicted in FIG. 2B and a schematic side view of a cartridge inserted into the adaptor in accordance with at least one example embodiment.

FIGS. 2A-2C illustrate at least one example embodiment of an aerosol generating device 200, cartridge 100, and adaptor 300. The aerosol generating device 200 includes a housing 210 that forms a receptacle 220 for receiving aerosol generating articles. The device 200 includes an elongate heating element 230 that extends into the receptacle 220. The heating element 230 is operably coupled to control electronics 250 and power supply 240, which cooperate to heat the heating element 230. The device 200 may be, for example, a Philip Morris International iQOS® aerosol generating device or other available aerosol generating device that may be configured to receive aerosol generating articles other than the cartridges described herein.

An adaptor 300 may be used to allow the device 200 to be used with a cartridge 100 described in the present disclosure. In the depicted embodiment, the adaptor 300 comprises a housing 310 that includes a thermally conductive material to transfer heat from the heating element 230 to the cartridge 100. The housing 310 of the adaptor 300 defines a cavity 320 for receiving the cartridge 100 and a slot 330 for receiving the heating element 230 of the device 200. The adaptor 300 may be inserted into the receptacle 220 of the device 200 such that the heating element 230 is received in the slot 330, as depicted in FIG. 2B. In at least one embodiment, the heating element 230 contacts the housing 310 defining the slot 330 to make thermal contact.

A distal end of the cartridge 100 may be inserted into the cavity 320 of the adaptor 300, as depicted in FIG. 2C. When the cartridge 100 is received in the cavity 320 of the adaptor 300 and the heating element 230 of the device 200 is received in the slot 330 of the adaptor 300, the heating element 230 of the device 200 may heat the cartridge 100 through the adaptor 300.

Using an appropriate adaptor, one example of which is depicted in FIGS. 2A-2C, any suitable aerosol generating device may be employed to heat a cartridge as disclosed herein.

Figure 3:
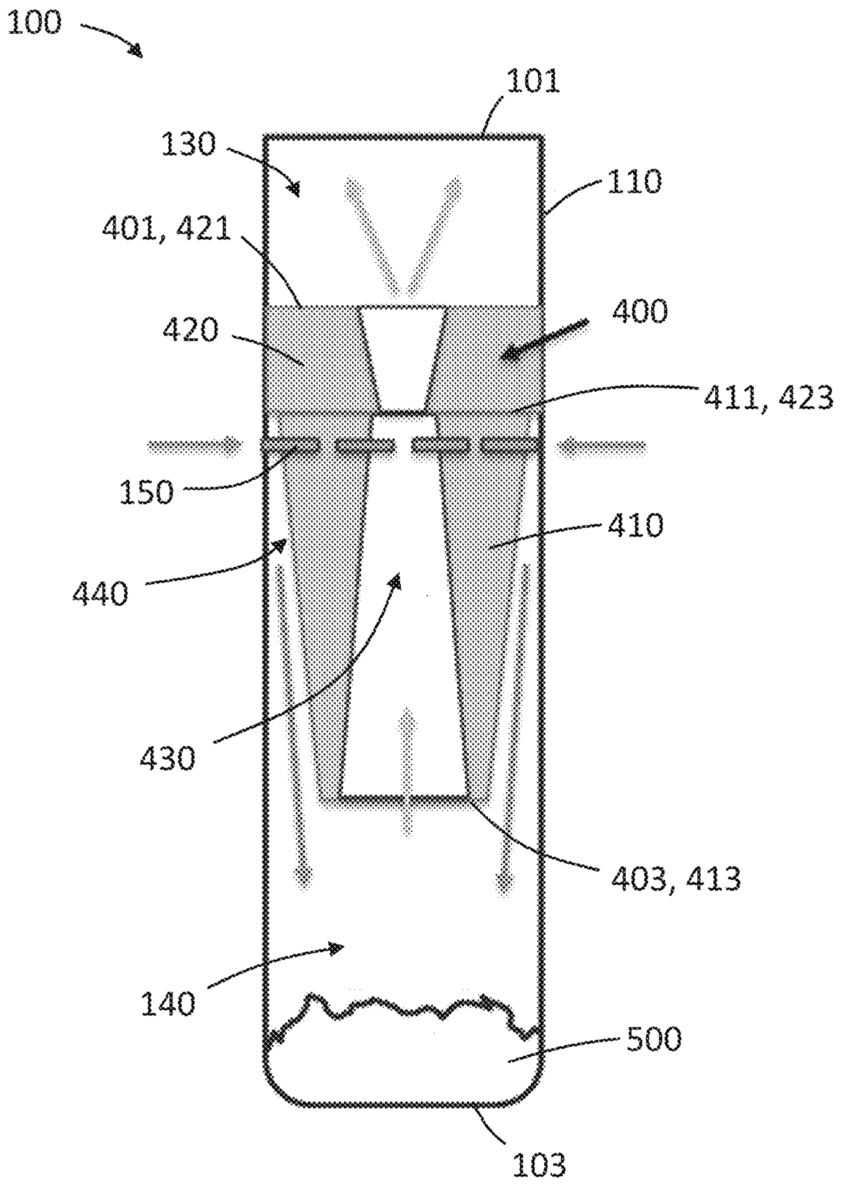
FIGS. 3-6 are schematic sectional views of cartridges in various example embodiments.

FIG. 3 depicts an example embodiment of a cartridge 100 including a housing 110 and a flow control apparatus 400. The housing 110 and flow control apparatus 400 may be formed from a single part or multiple parts.

The flow control apparatus 400 has a proximal end 401, a distal end 403 and an interior passageway 430 from the distal end 403 to the proximal end 401. The flow control apparatus 400 has a first portion 410 and a second portion 420. The first portion 410 defines a first portion of the passageway 430, which extends from the distal end 413 of the first portion 410 to the proximal end 411 of the first portion 410. The second portion 420 defines a second portion of the passageway 430, which extends from the distal end 423 of the second portion 420 to the proximal end 421 of the second portion 420. The first portion of the passageway 430 has a constricted cross-section moving from the distal end 413 to the proximal end 411 of the first portion 410 to cause air to accelerate through this portion of the passageway 430 when air is drawn toward the mouth end 101 of the cartridge 100. In other words, the cross-section of the first portion of the passageway narrows from the distal end 413 to the proximal end 411. The second portion of the passageway 430 has an expanding cross-section from the distal end 423 to the proximal end 421 of the second portion 420 of the flow control apparatus 400. In the second portion of the passageway 430, airflow may decelerate.

The housing 110 defines the open mouth end 101 of the cartridge 100 and the closed distal end 103. A composition 500, such as a gel composition, is disposed in the closed distal end 103 of the housing 110. Aerosol generated from the composition 500 when heated may enter the headspace 140 in the housing 110 above the composition 500 to be carried through the passageway 430.

Apertures 150 extend through the housing 110. At least one aperture 150 is in communication with a channel 440 formed between an outer surface of the flow control apparatus 400 and an inner surface of the housing 110. A seal is formed between an outer surface of second portion 420 of the flow control apparatus 400 and the housing 110 at a location between the apertures 150 and the mouth end 101.

When air is drawn through the mouth end 101 of the cartridge 100, air enters the apertures 150, flows through the channel 440 into the headspace 140 above the composition 500, where the air may entrain aerosol when the composition 500 is heated. The air may then flow through the airflow passageway 430, and through the mouth end 101. As air flows through the first portion of the passageway 430, the airflow accelerates. As air flows through the second portion of the passageway 430, the airflow decelerates. The second portion of the airflow passageway 430 is optional. In the depicted embodiment, the housing defines a cavity 130 between proximal end 401 of the flow control apparatus 400 and the mouth end 101 of the cartridge 100, which could serve to decelerate the airflow prior to exiting the mouth end 101.

Figure 4:
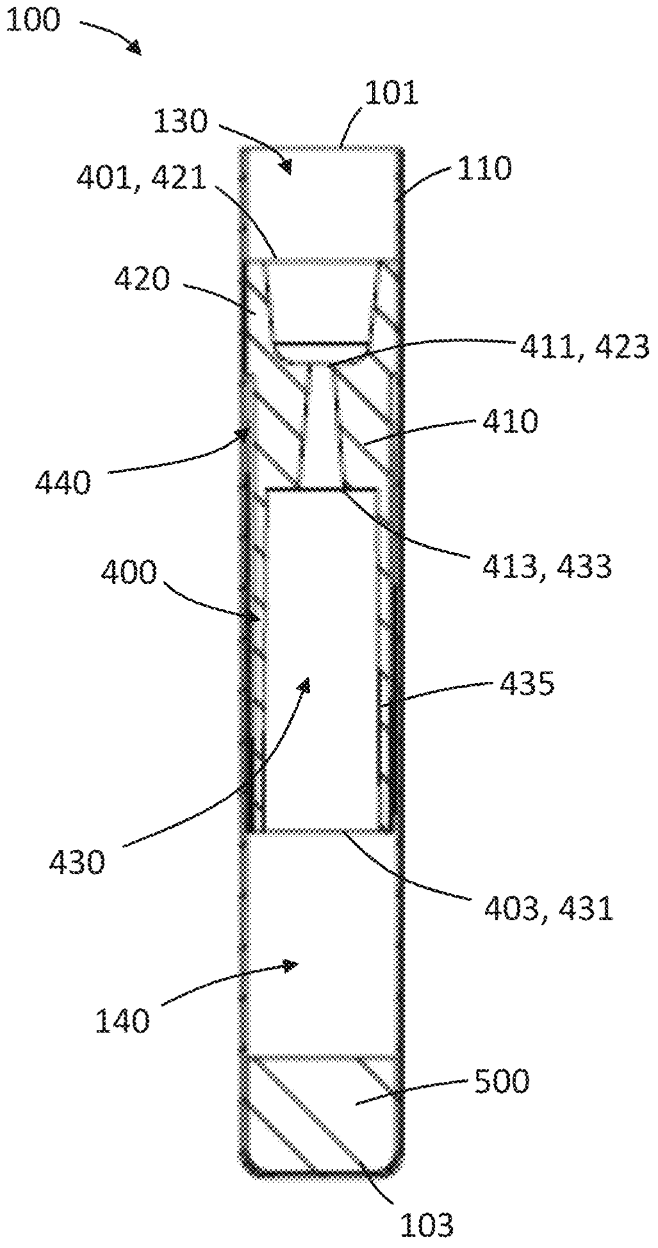

FIG. 4 depicts another example embodiment of a cartridge 100 including a housing 110 and a flow control apparatus 400. The housing 110 and flow control apparatus 400 may be formed from a single part or multiple parts.

The flow control apparatus 400 has a proximal end 401, a distal end 403 and an interior passageway 430 from the distal end 403 to the proximal end 401. The flow control apparatus 400 has a first portion 410, a second portion 420, and a third portion 435. The first portion 410 is between the second 420 and third 435 portions. The first portion 410 defines a first portion of the passageway 430, which extends from the distal end 413 of the first portion 410 to the proximal end 411 of the first portion 410. The second portion 420 defines a second portion of the passageway 430, which extends from the distal end 423 of the second portion 420 to the proximal end 421 of the second portion 420. The third portion 435 defines a third portion of the passageway 430, which extends from the distal end 433 of the third portion to the proximal end 431 of the third portion.

The third portion 435 has a substantially constant inner diameter from the proximal end 431 to the distal end 433. The first portion of the passageway 430 has a constricted cross-section moving from the distal end 413 to the proximal end 411 of the first portion 410 to cause air to accelerate through this portion of the passageway 430 when air is drawn through the mouth end 101 of the cartridge 100. In other words, the cross-section of the first portion of the passageway narrows from the distal end 413 to the proximal end 411. The second portion of the passageway 430 has an expanding cross-section from the distal end 423 to the proximal end 421 of the second portion 420 of the flow control apparatus 400. In the second portion of the passageway 430, airflow may decelerate.

Similar to the cartridge 100 depicted in FIG. 3, the cartridge depicted in FIG. 4 includes a housing 110 that defines an open mouth end 101 and a closed distal end 103. A composition 500, such as a gel composition, is disposed in the closed distal end 103 of the housing. Aerosol generated from the composition 500 when heated may enter the headspace 140 in the housing 110 above the composition 500 to be carried through the passageway 430.

While not shown in FIG. 4, the cartridge 100 includes at least one aperture (such as apertures 150 shown in FIG. 3) that extends through the housing 110 and is in communication with a channel 440 formed between an outer surface of the flow control apparatus 400 and an inner surface of the housing 110. A seal is formed between an outer surface of the second portion 420 of the flow control apparatus 400 and the housing 110 at a location between the apertures and the mouth end 101. The third portion 435 of the flow control apparatus 400, among other things, serves to extend the length of the flow control apparatus 400 and channel 440 to provide additional distance between the apertures (not shown in FIG. 4, which may be located in proximity to a proximal end of the channel) and the composition 500 to reduce the likelihood of leakage of the composition through the apertures.

When air is drawn through the mouth end 101 of the cartridge 100 depicted in FIG. 4, air enters the apertures, flows through the channel 440 into the headspace 140 above the composition 500, where the air may entrain aerosol when the composition 500 is heated. The air may then flow through the airflow passageway 430, and through the mouth end 101. As air flows through the passageway 430, the air flows through the third portion 435, the first portion 410, and then the second portion 420 of the cartridge 100. As air flows through the first portion of the passageway 430, the airflow accelerates. As air flows through the second portion of the passageway 430, the airflow decelerates. The second and third portions of the airflow passageway 430 are optional. In at least one example embodiment, the housing defines a cavity 130 between proximal end 401 of the flow control apparatus 400 and the mouth end 101 of the cartridge 100, which could serve to decelerate the airflow prior to exiting the mouth end 101.

Figure 5:
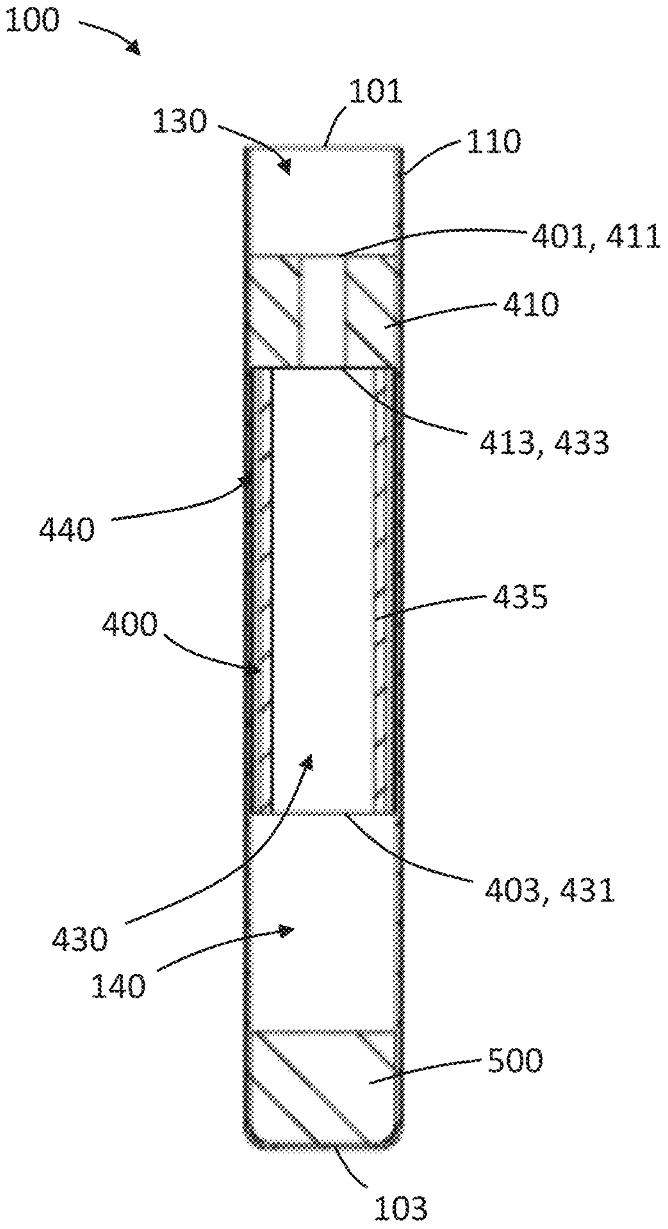
Figure 6:
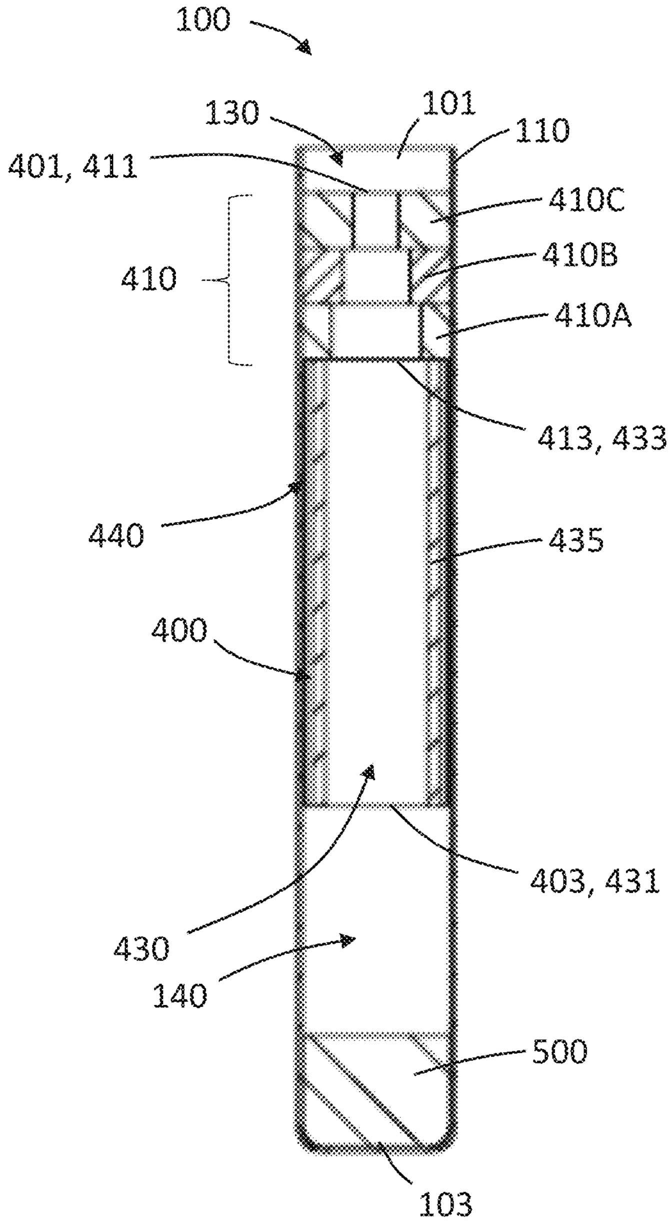

FIG. 5 and FIG. 6 depict additional example embodiments of cartridges 100 that include a housing 110 and a flow control apparatus 400. The flow control apparatus 400 has a proximal end 401, a distal end 403, and an interior passageway 430 from the distal end 403 to the proximal end 401. The flow control apparatus 400 has a first portion 410 and a third portion 435. The first portion 410 defines a first portion of the passageway 430, which extends from the distal end 413 of the first portion 410 to the proximal end 411 of the first portion 410. The third portion 435 defines a third portion of the passageway 430, which extends from the distal end 433 of the third portion to the proximal end 431 of the third portion. The third portion 435 has a substantially constant inner diameter from the proximal end 431 to the distal end 433.

In FIG. 5, the first portion of the passageway 430 has a substantially constant inner diameter from the distal end 413 to the proximal end 411 of the first portion 410. The inner diameter of the passageway 430 at the first portion 410 is smaller than the inner diameter of the passageway at the third portion 435. The restricted inner diameter of the passageway 430 at the first portion 410 relative to at the third portion 435 may cause air to accelerate as air flows from the third portion 435 to the first portion 410.

In FIG. 6, the first portion 410 of the flow control apparatus 400 includes multiple segments 410A, 410B, and 410C, with stepped internal diameters. The most distal segment 410A has the largest inner diameter, and the most proximal segment 410C has the smallest inner diameter. As air flows through the passageway 430 from the first segment 410A to the second segment 410B and from the second segment 410B to the third segment 410C, the air may accelerate as the passageway 430 cross-section constricts in a stepped manner.

The first portions 410 in FIG. 5 and FIG. 6 provide examples of construction that may be beneficial when the material employed to form the first portion 410 is not readily moldable. For example, the first portion 410 or the segments 410A, 410B, and 410C of the first portion 410 may be formed from cellulose acetate tow. In contrast, the first portions 410 of the flow control apparatus 400 depicted in FIG. 3 and FIG. 4 provide examples of construction that may be beneficial when the material employed to form the first portion 410 is moldable, such as when the first portion is formed from, for example, polyether ether ketone (PEEK).

Similar to the cartridge 100 depicted in FIG. 3 and FIG. 4, the cartridges depicted in FIG. 5 and FIG. 6 include a housing 110 that defines an open mouth end 101 and a closed distal end 103. A composition 500, such as a gel composition, is disposed in the closed distal end 103 of the housing. Aerosol generated from the composition 500 when heated may enter the headspace 140 in the housing 110 above the composition 500 to be carried through the passageway 430.

While not shown in FIG. 5 and FIG. 6, the cartridge 100 includes at least one aperture (such as apertures 150 shown in FIG. 3) that extends through the housing 110 and is in communication with a channel 440 formed between an outer surface of the flow control apparatus 400 and an inner surface of the housing 110. A seal is formed between the flow control apparatus 400 and the housing 110 at a location between the apertures and the mouth end 101. The third portion 435 of the flow control apparatus 400, among other things, serves to extend the length of the flow control apparatus 400 and channel 440 to provide additional distance between the apertures (not shown in FIG. 5 and FIG. 6, which may be located in proximity to a proximal end of the channel) and the composition 500 to reduce the likelihood of leakage of the composition through the apertures.

When air is drawn through the mouth end 101 of the cartridge 100 depicted in FIG. 5 and FIG. 6, air enters the apertures, flows through the channel 440 into the headspace 140 above the composition 500, where the air may entrain aerosol when the composition 500 is heated. The air may then flow through the airflow passageway 430 and through the mouth end 101. As air flows through the passageway 430, the air flows through the third portion 435 and then the first portion 410 of the cartridge 100. As air flows into the first portion of the passageway 430, the airflow may accelerate because the inner diameter of the passageway 430 at the first portion 410 is less than at the third portion 435. In the cartridge 100 depicted in FIG. 6, the airflow may accelerate as air passes each segment 410A, 410B, and 410C of the first portion 410.

In the embodiments depicted in FIG. 5 and FIG. 6, the housing 110 defines a cavity 130 between proximal end 401 of the flow control apparatus 400 and the mouth end 101 of the cartridge 100, which could serve to decelerate the airflow that exits the passageway 430 at the proximal end 401 of the flow control apparatus 400 prior to exiting the mouth end 101.

Figure 7A:
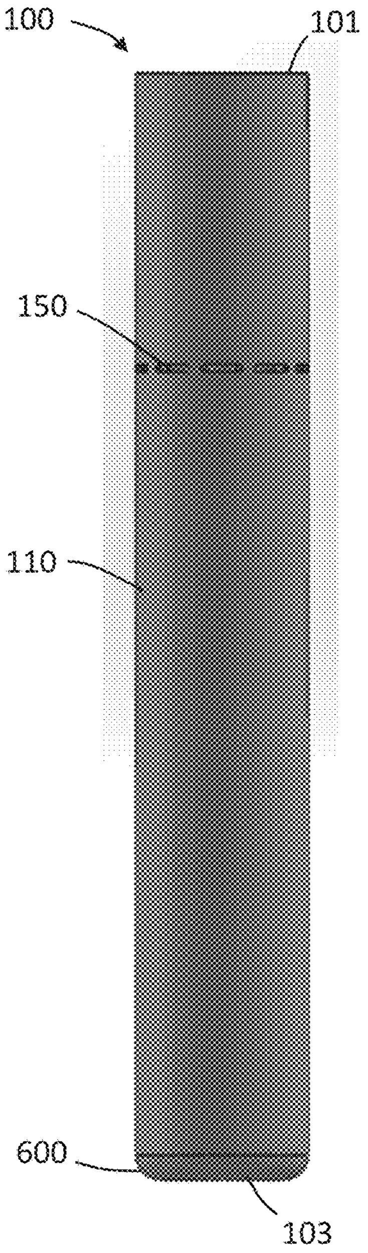
FIG. 7A is a schematic side view of a cartridge in accordance with at least one example embodiment.
Figure 7B:
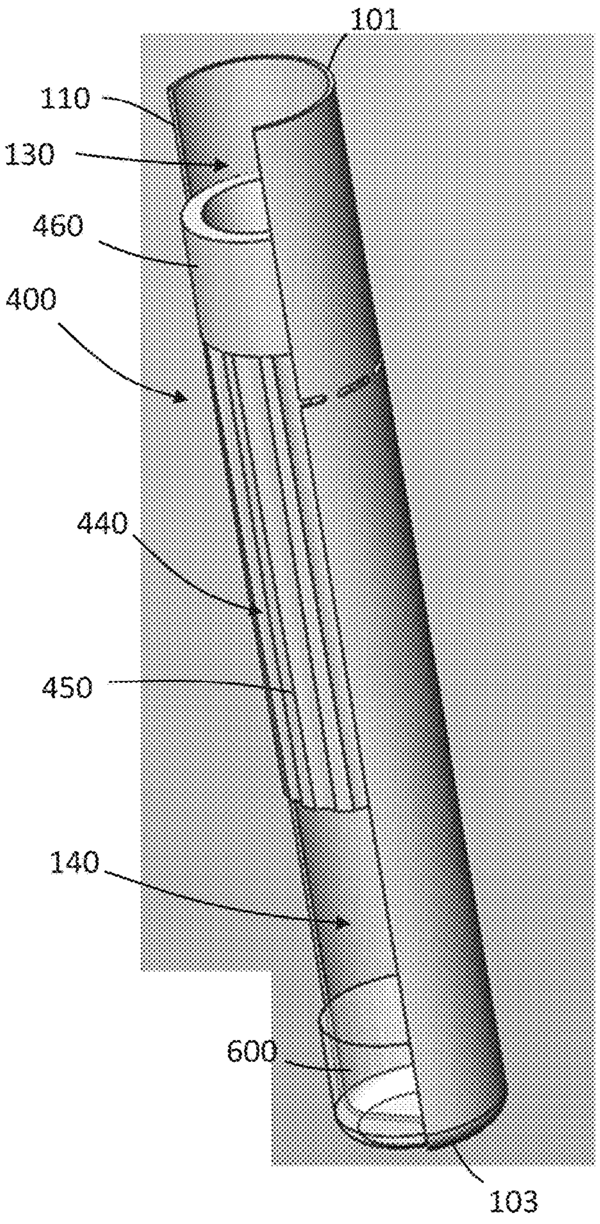
FIG. 7B is a schematic perspective view of the cartridge depicted in FIG. 7A in which a section of the housing removed in accordance with at least one example embodiment.

FIGS. 7A-7B illustrate at least one example embodiment of a cartridge 100. The cartridge 100 includes a housing 110 and apertures 150 through the housing 110. The housing 110 includes an end cap 600 that forms the distal end 103 of the cartridge 100. A composition comprising nicotine (not shown) may be disposed in the end cap. When heated, the composition may form an aerosol that may enter a headspace 140 above the end cap 600.

In at least one example embodiment, at least one of the apertures 150 is in communication with at least one channel 440 formed between the flow control apparatus 400 and the housing 110 and between sidewalls 450. The flow control apparatus 400 has a rim (or outer surface) 460 that presses against an inner surface of the housing 110 to form a seal. The seal is formed between the mouth end 101 and the apertures 150.

When air is drawn through the mouth end 101, air may enter the apertures 150, flow through the channels 440 to the headspace 140, through an internal passageway through the flow control apparatus 400, into cavity 130 defined by the housing 110, and through the mouth end 101. The internal passageway of the flow control apparatus 400 may be configured in any suitable manner, such as shown in FIGS. 3-6.

Figure 8:
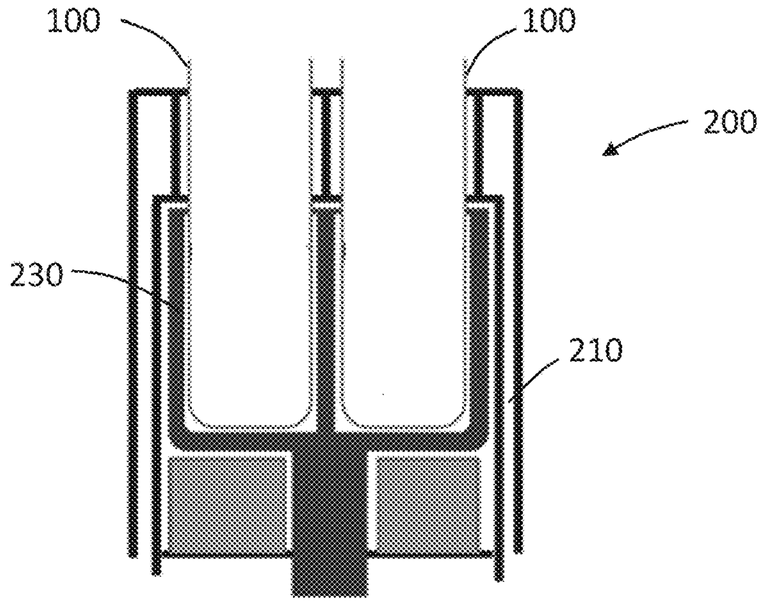
FIG. 8 is a portion of a schematic side view of cartridges and schematic sectional view of an aerosol generating device into which the cartridges are inserted in accordance with at least one example embodiment.

FIG. 8 illustrates a portion of an aerosol generating device 200 configured to receive more than one cartridge 100. Two cartridges 100 are received by the device 200. Only distal portions of the cartridges 100 are shown. The aerosol generating device 200 has a housing 210 that forms a receptacle for receiving the cartridges 100. A heating element 230 extends into the receptacle and forms two cavities, each configured to receive and contact a distal end portion of a cartridge 100. The heating element 230 may surround the distal portion of the cartridge 100 when the cartridge 100 is received in the cavity of the heating element 230.

Figure 9:
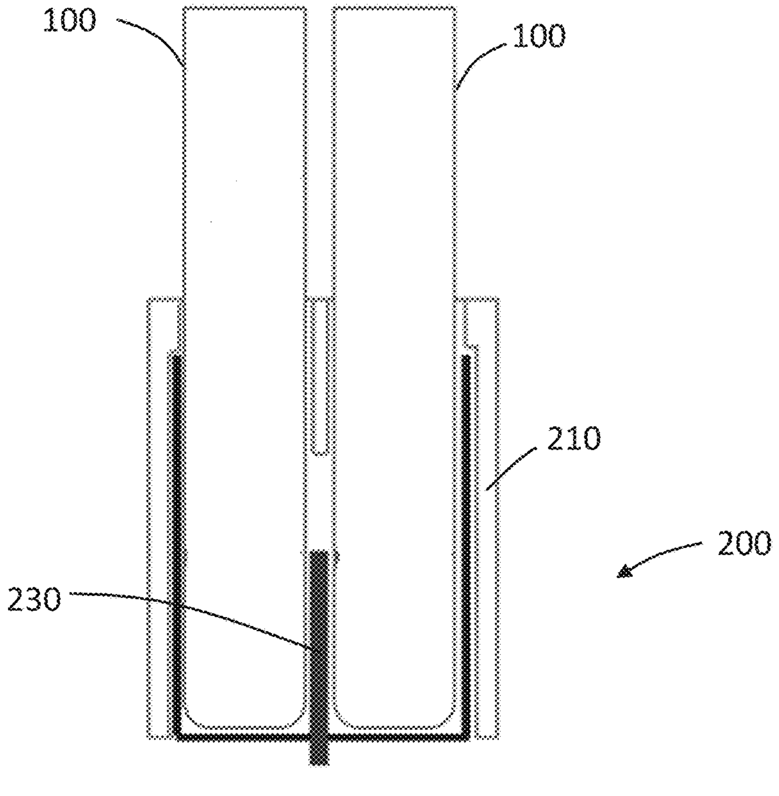
FIG. 9 is a schematic sectional side view of cartridges and a portion of a schematic sectional view of an aerosol generating device into which the cartridges are inserted in accordance with at least one example embodiment.

FIG. 9 illustrates a portion of another aerosol generating device 200 configured to receive more than one cartridge 100. Two cartridges 100 are received by the device 200. The aerosol generating device 200 has a housing 210 that forms a receptacle for receiving the cartridges 100. An elongate heating element 230 extends into the receptacle. One cartridge 100 is received on one side of the elongate heating element 230, and the other cartridge 100 is received on the other side of the heating element 230. In at least one example embodiment, the cartridges 100 contact the heating element 230 for efficient heat transfer via conduction between the heating element and the cartridge housing.

The cartridges 100 depicted in FIGS. 8 and 9 may contain the same compositions comprising nicotine. However, in some example embodiments, the cartridges may comprise different compositions. In some example embodiments, at least one of the cartridges 100 contains a composition that does not contain nicotine. For example, the composition in one of the cartridges 100 may comprise a flavorant. A variety of cartridge 100 combinations are available. A manifold (not shown) may be employed to facilitate simultaneous drawing on both cartridges 100. As such, the pair of cartridges 100 may be considered to be a pair of sub-cartridges, which when joined together form a complete cartridge.

Figure 10A:
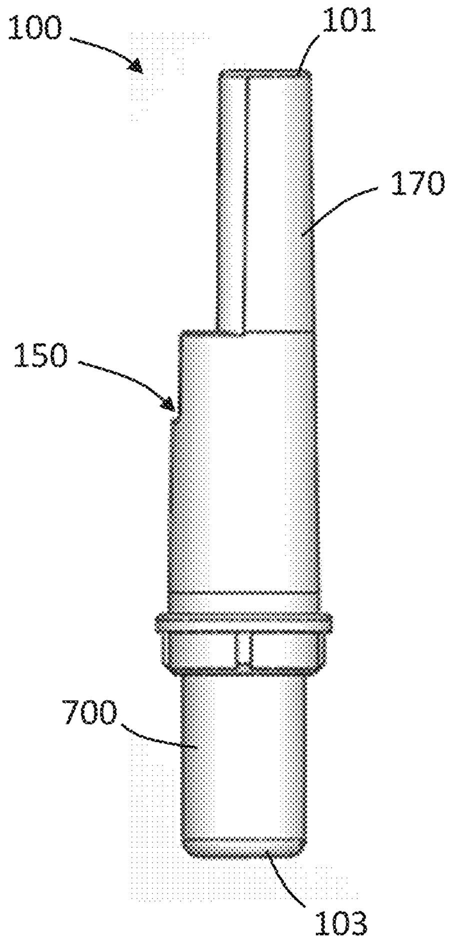
FIG. 10A is a schematic side view of a cartridge in accordance with at least one example embodiment.
Figure 10B:
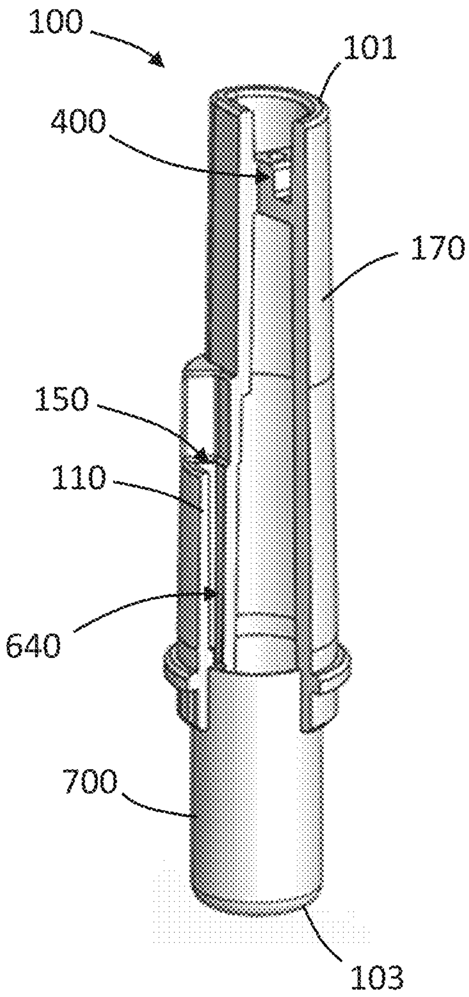
FIG. 10B is a schematic side view of the cartridge depicted in FIG. 10A with a portion of housing removed in accordance with at least one example embodiment.

FIGS. 10A-10B illustrate at least one example embodiment of a cartridge 100 that includes a mouthpiece 170 that forms a portion of the housing 110 and the flow control apparatus 400 of the cartridge 100. The cartridges 100 include a closed-end tube 700 that forms the distal end 103 or closed end of the cartridge 100 and also forms a portion of the housing. The closed-end tube 700 is configured to be received by a distal portion of the mouthpiece 170, such as by an interference fit. The composition comprising nicotine (not shown) may be disposed in the closed-end tube 700.

The flow control apparatus 400 includes an internal passageway (not shown) that includes a portion that accelerates air, and may include a portion that decelerates air. A seal is formed between the housing 110 and the flow control apparatus 400 because the housing 110 and the flow control apparatus 400 are formed from a single part. An aperture 150 is formed in the housing 110 and is in communication with a channel 640 that is formed at least in part by an inner surface of the housing 110. Part of the channel 640 is generally formed between the inner surface of the housing 110 and an exterior of the flow control apparatus 400. The channel 640 extends less than the full distance around the housing 110. In this embodiment, the channel 640 extends around about 50% of the distance around the circumference of the housing. The channel 640 directs air from the aperture 150 towards an inner surface of the distal end 103.

When air is drawn through the mouth end 101, air enters the cartridge 100 through the aperture 150. The air flows through the channel 640 towards a composition disposed in the distal end 103. The air then flows through an internal passageway of the flow control apparatus 400, where the air is accelerated and optionally decelerated. The air may then exit the mouth end 101.

Figure 11A:
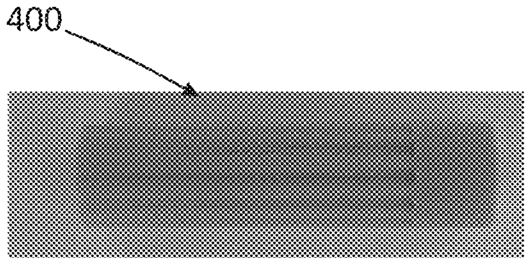
FIG. 11A is an image of a flow control apparatus of a sample cartridge in accordance with at least one example embodiment.

FIG. 11A is an image of a flow control apparatus 400 formed from polyetheretherketone (PEEK) (material) by CNC machining. The flow control apparatus depicted in FIG. 8A has a length of about 25 mm, an outer diameter at the proximal end of about 6.64 mm, and an outer diameter at the distal end of about 6.29 mm. The outer diameter at the distal end is the diameter of the distal end from the base of the sidewalls. The flow control apparatus has about 12 channels formed around its exterior surface, each sidewall having a substantially semi-circular transverse cross-section. The channels have a radius of about 0.75 mm and a length of about 20 mm. The flow control apparatus has an internal (airflow) passageway comprising three portions, a first portion (an air accelerating portion) a second portion (air decelerating portion) downstream or proximal to the first portion and a third portion upstream or distal to the first portion.

The third portion of the interior passageway of the flow control apparatus extends from the distal end of the apparatus and has an inner diameter at the distal end of about 5.09 mm, which tapers down to a diameter of about 4.83 mm at a proximal end of the first portion of the interior passageway. The length of the first portion of the interior passageway is about 15 mm. The first portion of the interior passageway extends from a distal end at the proximal end of the third portion to a proximal end. The first portion of the internal passageway has an inner diameter of about 2 mm at its distal end, which constricts to about 1 mm at the proximal end. The length of the first portion of the interior passageway is about 5.5 mm. The second portion of the interior passageway extends from a distal end at the proximal end of the first portion to a proximal end at the proximal end of the apparatus. The second portion of the internal passageway has an inner diameter of about 1 mm at its distal end, which is the same as the inner diameter at the proximal end of the first portion. The inner diameter of the second portion increases at a decreasing rate (i.e. in a curve) to the proximal end, which has an inner diameter of about 5 mm. The length of the second portion is about 4.5 mm.

Accordingly, air drawn through the interior passageway of the flow control apparatus, from the distal end to the proximal end, encounters a chamber with a substantially constant inner diameter (the third portion), a constricted section configured to accelerate the air (the first portion), and an expanded section configured to decelerate the air (the second portion). Providing such an airflow passageway for the aerosol generated from the heated composition may enable aerosol volume and droplet size to be controlled such that a satisfactory aerosol reaches the mouthpiece.

Figure 11B:
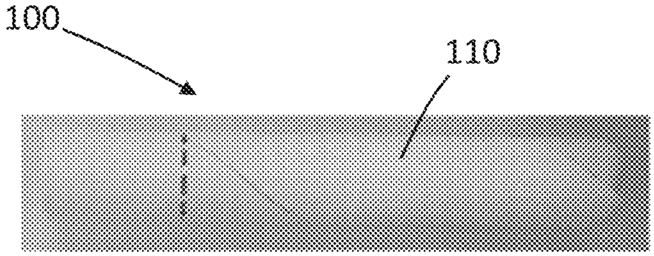
FIG. 11B is an image of a sample cartridge in which the flow control apparatus depicted in FIG. 11A is inserted in accordance with at least one example embodiment.

FIG. 11B is an image of an assembled cartridge 100. The cartridge 100 includes a housing 110 into which the flow control apparatus of FIG. 11A is inserted. The housing depicted in FIG. 11B is generally a right circularly cylindrical cardboard tube having a length of about 45 mm. One end of the tube is closed to provide the closed end of the housing for holding the composition. In this embodiment, the closed end of the tube has been closed by folding an end portions of the walls of the tube over themselves. However, it will be appreciated that the closed end may be closed by any other suitable means, such as by pinching and folding or by securing a cap over the closed end. The proximal portion of the exterior of the flow control apparatus, above the channels, has a diameter of about 6.64 mm. This diameter is substantially identical to the inner diameter of the cardboard tube, such that an interference fit seal is formed between the proximal portion of the exterior of the flow control apparatus and the interior of the tubular housing. The distal portion of the exterior of the flow control apparatus, extending the length of the channels, may have a diameter that is slightly less than the diameter of the proximal portion of the exterior of the flow control apparatus, such that the flow control apparatus may be easily inserted into the housing up to the proximal portion of the exterior, where the interference fit is made.

We claim:

1. A cartridge for use with an aerosol generating device, the cartridge comprising:

a housing defining a closed end, an open end, and an aperture between the closed end and the open end;

a composition in the housing, the composition in proximity to the closed end, the composition including nicotine;

a flow control apparatus in the housing, the flow control apparatus including, a proximal end adjacent the open end of the housing, a distal end adjacent the closed end of the housing, and an internal airflow passageway between the distal end and the proximal end, the internal airflow passageway including a first portion adjacent the distal end, the first portion having a first inner diameter, the first inner diameter being constant from the distal end towards the proximal end and a second portion above the first portion, the second portion having a second inner diameter, the second inner diameter being constant from the distal end towards the proximal end, the second inner diameter less than the first inner diameter; and the composition and the distal end of the flow control apparatus defining a headspace therebetween.

2. The cartridge according to claim 1, wherein the housing defines a plurality of apertures circumscribing the housing, the plurality of apertures including the aperture.

3. A cartridge for use with an aerosol generating device, the cartridge comprising:

a housing defining a closed end, an open end, and an aperture between the closed end and the open end;

a composition in the housing, the composition in proximity to the closed end, the composition including nicotine;

a flow control apparatus in the housing, the flow control apparatus including, a proximal end adjacent the open end of the housing, a distal end adjacent the closed end of the housing, and an internal airflow passageway between the distal end and the proximal end, the internal airflow passageway including a first portion adjacent the distal end, and a second portion above the first portion; and the composition and the distal end of the flow control apparatus defining a headspace therebetween, wherein the internal airflow passageway further includes a third portion adjacent to the proximal end, the second portion between the first portion and the third portion;

the first portion has a first inner diameter, the first inner diameter being constant from the distal end towards the proximal end;

the second portion has a cross-section that decreases from the distal end towards the proximal end; and the third portion has a cross-sectional area that increases from the distal end towards the proximal end.

4. A cartridge for use with an aerosol generating device, the cartridge comprising:

a housing defining a closed end, an open end, and an aperture between the closed end and the open end;

a composition in the housing, the composition in proximity to the closed end, the composition including nicotine;

a flow control apparatus in the housing, the flow control apparatus including, a proximal end adjacent the open end of the housing, a distal end adjacent the closed end of the housing, and an internal airflow passageway between the distal end and the proximal end, the internal airflow passageway including a first portion adjacent the distal end, and a second portion above the first portion; and the composition and the distal end of the flow control apparatus defining a headspace therebetween, wherein the first portion has a first inner diameter, the first inner diameter being constant from the distal end towards the proximal end; and the second portion includes a first segment, a second segment, and a third segment, the second segment between the first segment and the third segment.

5. The cartridge according to claim 4, wherein the first segment includes the first inner diameter, the second segment includes a second inner diameter, the second inner diameter smaller than the first inner diameter; and the third segment includes a third inner diameter, the third inner diameter less than the second inner diameter.

6. A cartridge for use with an aerosol generating device, the cartridge comprising:

a housing defining a closed end, an open end, and an aperture between the closed end and the open end;

a composition in the housing, the composition in proximity to the closed end, the composition including nicotine;

a flow control apparatus in the housing, the flow control apparatus including, a proximal end adjacent the open end of the housing, a distal end adjacent the closed end of the housing, and an internal airflow passageway between the distal end and the proximal end, the internal airflow passageway including, a first portion adjacent the distal end, and a second portion above the first portion; and the composition and the distal end of the flow control apparatus defining a headspace therebetween; and a seal between an exterior of the flow control apparatus and an interior of the housing, the seal being between the open end of the housing and the aperture of the housing.

7. A cartridge for use with an aerosol generating device, the cartridge comprising:

a housing defining a closed end, an open end, and an aperture between the closed end and the open end;

a composition in the housing, the composition in proximity to the closed end, the composition including nicotine;

a flow control apparatus in the housing, the flow control apparatus including, a proximal end adjacent the open end of the housing, a distal end adjacent the closed end of the housing, and an internal airflow passageway between the distal end and the proximal end, the internal airflow passageway including a first portion adjacent the distal end, and a second portion above the first portion, the composition and the distal end of the flow control apparatus defining a headspace therebetween; and a channel defined between a portion of an exterior of the flow control apparatus and an interior of the housing, the channel being in communication with the aperture and configured to direct air towards the composition.

8. A cartridge for use with an aerosol generating device, the cartridge comprising:

a housing defining a closed end, an open end, and an aperture between the closed end and the open end;

a composition in the housing, the composition in proximity to the closed end, the composition including nicotine;

a flow control apparatus in the housing, the flow control apparatus including, a proximal end adjacent the open end of the housing, a distal end adjacent the closed end of the housing, and an internal airflow passageway between the distal end and the proximal end, the internal airflow passageway including a first portion adjacent the distal end, and a second portion above the first portion; and the composition and the distal end of the flow control apparatus defining a headspace therebetween, wherein the flow control apparatus and the housing are separate parts and wherein the flow control apparatus is removably securable to the housing.

9. The cartridge according to claim 8, wherein the flow control apparatus and the housing are configured to be coupled by an interference fit.

10. A cartridge for use with an aerosol generating device, the cartridge comprising:

a housing defining a closed end, an open end, and an aperture between the closed end and the open end;

a composition in the housing, the composition in proximity to the closed end, the composition including nicotine;

a flow control apparatus in the housing, the flow control apparatus including, a proximal end adjacent the open end of the housing, a distal end adjacent the closed end of the housing, and an internal airflow passageway between the distal end and the proximal end, the internal airflow passageway including a first portion adjacent the distal end, and a second portion above the first portion; and the composition and the distal end of the flow control apparatus defining a headspace therebetween, wherein the housing includes a first part and a second part, the first part including a mouthpiece configured to retain the second part, and the second part including the composition.

11. The cartridge according to claim 10, wherein the first part includes the flow control apparatus.

12. The cartridge according to claim 1, wherein the composition is a gel.

13. A system comprising:

a cartridge including, a housing defining a closed end, an open end, and an aperture between the closed end and the open end;

a composition in the housing in proximity to the closed end, the composition including nicotine;

a flow control apparatus in the housing, the flow control apparatus including, a proximal end adjacent the open end of the housing, a distal end adjacent the closed end of the housing, an internal airflow passageway between the distal end and the proximal end, the internal airflow passageway including, a first portion adjacent the distal end, and a second portion above the first portion;

an aerosol generating device including, a receptacle configured to receive at least the closed end of the housing, and a heater coupled to the receptacle and configured to heat the receptacle; and a thermally conductive adaptor including a second receptacle, wherein the heater includes an elongate heating element, and the thermally conductive adaptor is configured to transfer heat from the elongate heating element to the second receptacle when the thermally conductive adaptor is within the receptacle.

14. A system comprising:

a cartridge including, a housing defining a closed end, an open end, and an aperture between the closed end and the open end;

a composition in the housing in proximity to the closed end, the composition including nicotine;

a flow control apparatus in the housing, the flow control apparatus including, a proximal end adjacent the open end of the housing, a distal end adjacent the closed end of the housing, an internal airflow passageway between the distal end and the proximal end, the internal airflow passageway including, a first portion adjacent the distal end, and a second portion above the first portion; and an aerosol generating device including, a receptacle configured to receive at least the closed end of the housing, and a heater coupled to the receptacle and configured to heat the receptacle, wherein the heater defines a cavity configured to receive the cartridge.

15. A system comprising:

a cartridge including, a housing defining a closed end, an open end, and an aperture between the closed end and the open end;

a composition in the housing in proximity to the closed end, the composition including nicotine;

a flow control apparatus in the housing, the flow control apparatus including, a proximal end adjacent the open end of the housing, a distal end adjacent the closed end of the housing,
an internal airflow passageway between the distal end and the proximal end, the internal airflow passageway including,
a first portion adjacent the distal end, and
a second portion above the first portion; and
an aerosol generating device including,
a receptacle configured to receive at least the closed end of the housing, and
a heater coupled to the receptacle and configured to heat the receptacle, wherein the cartridge further comprises:
a seal between an exterior of the flow control apparatus and an interior of the housing, the seal between the open end of the housing and the aperture of the housing.

16. A system comprising:
a cartridge including,
a housing defining a closed end, an open end, and an aperture between the closed end and the open end;
a composition in the housing in proximity to the closed end, the composition including nicotine;
a flow control apparatus in the housing, the flow control apparatus including, a proximal end adjacent the open end of the housing,
a distal end adjacent the closed end of the housing,
an internal airflow passageway between the distal end and the proximal end, the internal airflow passageway including,
a first portion adjacent the distal end, and
a second portion above the first portion; and
an aerosol generating device including,
a receptacle configured to receive at least the closed end of the housing, and
a heater coupled to the receptacle and configured to heat the receptacle, wherein the cartridge further comprises:
a channel defined between a portion of an exterior of the flow control apparatus and an interior of the housing, the channel being in communication with the aperture and directs air towards the composition including nicotine.

17. The system according to claim 13, wherein the cartridge further comprises:
a headspace defined between the composition and the distal end of the flow control apparatus.

* * * * *